United States Patent
Turner et al.

(10) Patent No.: US 7,496,867 B2
(45) Date of Patent: Feb. 24, 2009

(54) CELL LIBRARY MANAGEMENT FOR POWER OPTIMIZATION

(75) Inventors: Mark F. Turner, Longmont, CO (US); Jonathan W. Byrn, Fort Collins, CO (US); Jeffrey S. Brown, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 37 days.

(21) Appl. No.: 11/732,092

(22) Filed: Apr. 2, 2007

(65) Prior Publication Data

US 2008/0244474 A1 Oct. 2, 2008

(51) Int. Cl.
*G06F 17/50* (2006.01)
(52) U.S. Cl. .................. 716/2; 716/5; 716/11
(58) Field of Classification Search .............. None
See application file for complete search history.

(56) References Cited

U.S. PATENT DOCUMENTS 5,692,160 A * 11/1997 Sarin ................ 703/23
7,114,134 B2 * 9/2006 Zhang et al. .............. 716/3
2005/0278659 A1 * 12/2005 Zhang et al. .............. 716/1

* cited by examiner

*Primary Examiner*—Leigh Marie Garbowski
(74) *Attorney, Agent, or Firm*—Christopher P. Maiorana, PC

(57) ABSTRACT

A method of managing a cell library regarding power optimization is disclosed. The method generally includes the steps of (A) reading a plurality of first modules within a first region of a circuit design stored in a design file, (B) calculating a first merit value indicating a relative sensitivity of the first region to a power consumption, the first merit value having a range from a static power dominated value to a dynamic power dominated value and (C) creating a constraint file configured to limit a design tool to a first subset of a plurality of replacement modules based on the first merit value such that the design tool automatically optimizes the power consumption of the first region by replacing at least one of the first modules with at least one of the replacement modules within the first subset, the replacement modules residing in a library file.

20 Claims, 10 Drawing Sheets

STATIC POWER OPTIMIZATION

DYNAMIC POWER OPTIMIZATION

CELL LIBRARY MANAGEMENT FOR POWER OPTIMIZATION

FIELD OF THE INVENTION

The present invention relates to circuit optimization generally and, more particularly, to cell library management for power optimization.

BACKGROUND OF THE INVENTION

Referring to FIG. 1, a flow diagram of a conventional design optimization process 20 is shown. Conventional software tools 22 create a layout of a circuit using a design netlist 24, timing constraints 26 and several cell libraries 28 (i.e., 28a-28c). The tools 22 can optimize an area and a performance (speed) of the circuitry, but power optimization is neglected. Commonly, each cell in the cell libraries 28 is part of a family with different sized transistors for the same functionality. The cell variations give the design tools 22 a rich, wide variety of cells for area optimization and speed optimization. The different cells within a family have different power characteristics. However, a power adjustment 30 is conventionally performed as a post-optimization step. Furthermore, the tools often have no way to distinguish between static (leakage) power and dynamic (switching) power.

Static power consumption is caused by current leaking while the circuit is not switching. The leakage is often across terminals of the transistors that should be biased "off". However, deep-submicron processes have small spacings between elements that cannot fully stop the current leakage. Static current consumption can be reduced by changing the process slightly to shift a threshold voltage (Vt) in the transistors. Higher Vt transistors leak less current (possibly by an order of magnitude or more) than lower Vt transistors. Static current consumption is also reduced by increasing gate channel lengths. Increasing the length between a source and a drain of a transistor causes a dramatic reduction in leakage currents. Another conventional approach is to make a width the transistor smaller. Channel width reduction results in a 1:1 leakage reduction. Cutting the channel width in half cuts the leakage current in half. All of the above leakage reduction techniques make the transistors slower. Only the channel width reduction technique reduces dynamic power.

Dynamic power utilization is caused mainly by switching activity. An equation characterizing dynamic power is provided in equation 1 as follows:

$$P = CV^2F \qquad \text{Eq.(1)}$$

where P is the power, C is a capacitance, V is the voltage swing and F is the effective switching frequency. Because dynamic power is directly proportional to capacitance and making transistors smaller results in less capacitance, making the transistors smaller is a primary mechanism for reducing dynamic power.

Static power dominated circuits commonly have low operating frequencies, low data toggling rates (activity), long periods of inactivity in the system (system duty cycle) and some circuits can gate the clocks to stop toggling during system inactivity. Dynamic power dominated circuits commonly have very high operating frequencies, high activity rates, high system duty cycles and often do not gate the clocks because of a high system duty cycle. A large amount of gray area exists between the two extremes, so circuit designers are usually not aware of which power mode is more important for the application.

A current power optimization methodology is to use synthesis tools (either pre-layout or post-layout) to reduce power based on information in the cell libraries. The synthesis tools first optimize for meeting the targeted timing (speed) criteria with a minimum cell area. The tools then try to replace existing cells with equivalent cells that consume less power (as defined in the cell library, usually defined as only static power or the static power averaged at some toggling frequency with a dynamic power). The synthesis tools cannot often replace all cells and still meet timing goals because the cells that consume less power are usually slower.

No distinction commonly exists between static power consumption and dynamic power consumption in the existing approaches. The cell libraries have power numbers that are valid only for a given operating frequency and activity rate that likely misrepresent the power for an intended usage. The existing solutions do not provide a method for optimizing power. The existing solutions only reduce the power consumption a little for a certain operating frequency. Furthermore, the single frequency used in the characterization is often inappropriate for large system-on-a-chip designs having several subsystems with different usages and different frequencies.

Conventional cell libraries used in the optimization also lack "monotonicity" in a speed/area ratio and a power/area ratio. For example, monotonicity in the power/area ratio means that for a given cell function, if the cell area increases then the speed and power of the cell increase as well. Because static power and dynamic power are two different variables with different causes, conventional libraries tend be non-monotonic. As such, reduction in area does not always mean a reduction in static power.

SUMMARY OF THE INVENTION

The present invention concerns a method of managing a cell library regarding power optimization. The method generally comprises the steps of (A) reading a plurality of first modules within a first region of a circuit design stored in a design file, (B) calculating a first merit value indicating a relative sensitivity of the first region to a power consumption, the first merit value having a range from a static power dominated value to a dynamic power dominated value and (C) creating a constraint file configured to limit a design tool to a first subset of a plurality of replacement modules based on the first merit value such that the design tool automatically optimizes the power consumption of the first region by replacing at least one of the first modules with at least one of the replacement modules within the first subset, the replacement modules residing in a library file.

The objects, features and advantages of the present invention include providing cell library management for power optimization that may (i) characterize a circuit design regarding both dynamic power consumption and static power consumption, (ii) constrain replacement cell availability based on the characterization, (iii) work with existing cell libraries without special customization, (iv) work with existing design tools that lack a power optimization capability, (v) work with customized cell libraries, (vi) work with customized design tools and/or (vii) optimize different regions of a circuit differently.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention provides an organized method and/or architecture for determining which of multiple power modes is dominant in a circuit. The invention generally uses the resulting information to control library availability to design tools resulting in a best (lowest) total power utilization while still optimizing the circuit design in terms of area and speed.

Figure 1:
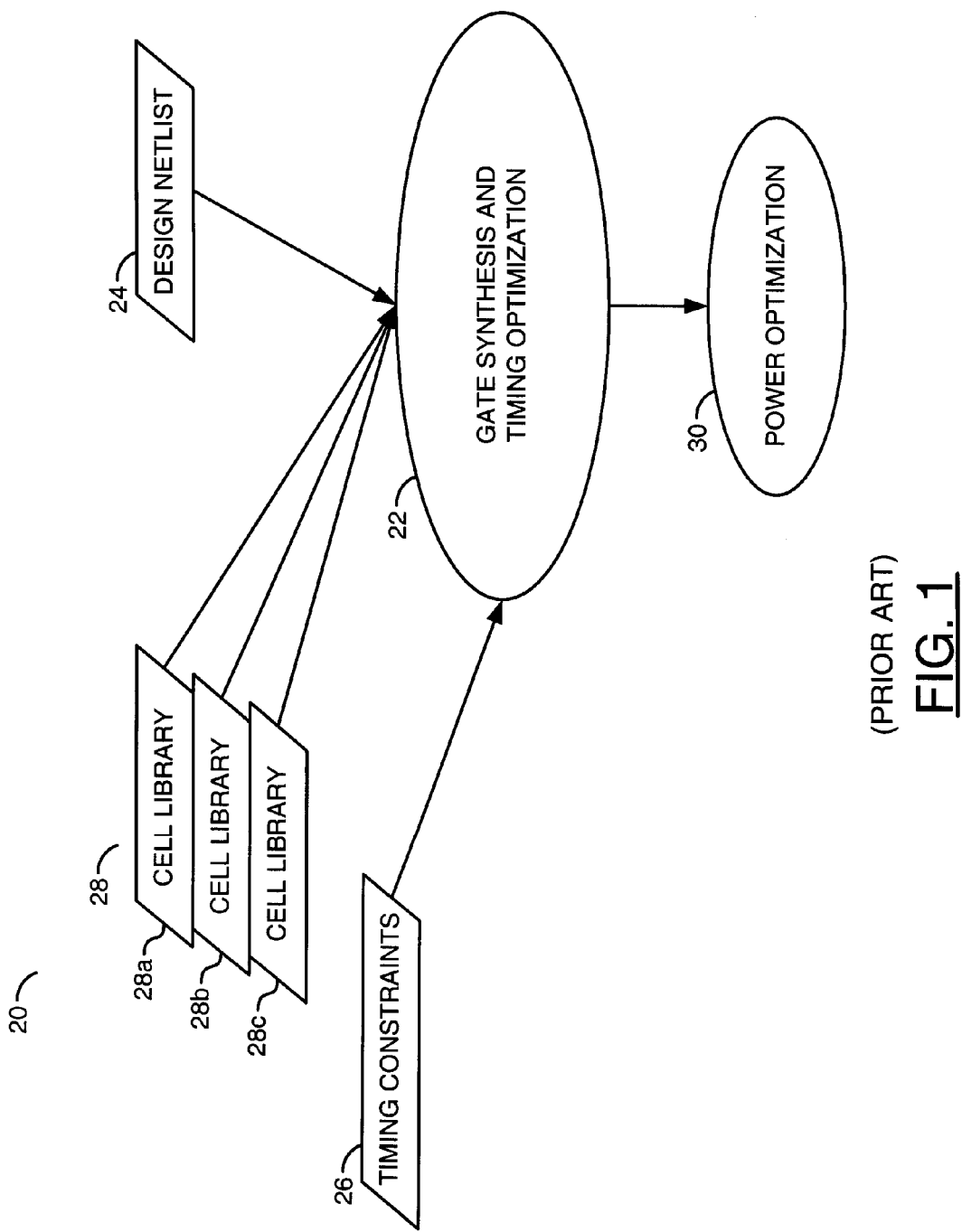
FIG. 1 is a flow diagram of a conventional design optimization process.
Figure 2:
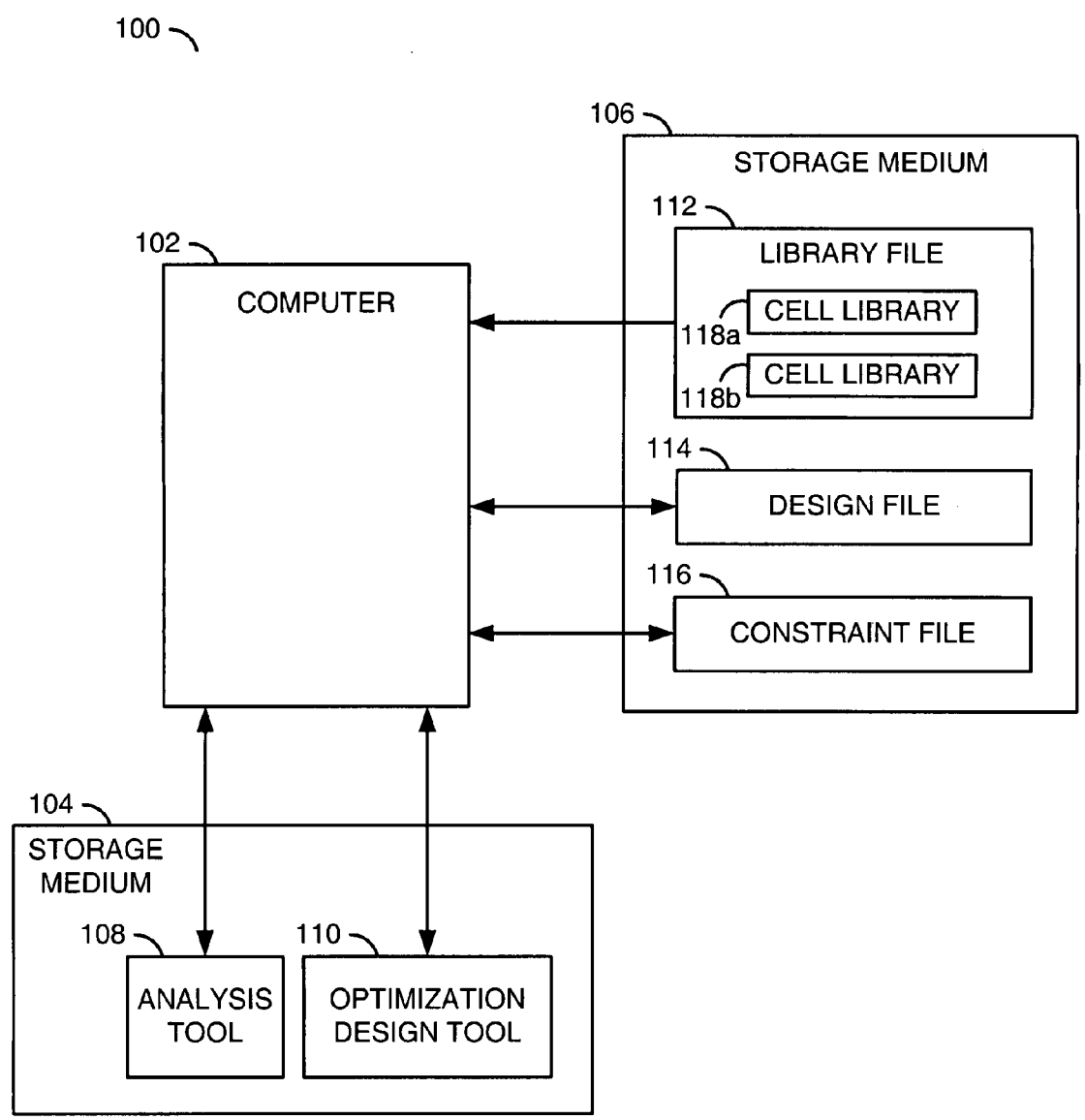
FIG. 2 is a block diagram of an example implementation of an apparatus in accordance with a preferred embodiment of the present invention.

Referring to FIG. 2, a block diagram of an example implementation of an apparatus 100 is shown in accordance with a preferred embodiment of the present invention. The apparatus (or system) 100 may be implemented as a computer system. The apparatus 100 generally comprises a circuit (or module) 102, a circuit (or module) 104 and a circuit (or module) 106. The circuit 102 may be implemented as a computer (or processor). The circuits 104 and 106 may be implemented as storage media (or memories).

The storage medium 104 may store a software program 108 and a software program 110, both readable and executable by the circuit 102. The software program 108 may be implemented as an analysis tool. The program 108 generally defines the steps of analyzing a circuit design for power utilization. The software program 110 may be implemented as one or more design tools, including an optimization design tool. The program 110 may be operational to replace individual cells within the circuit design with replacement cells from a library file with or without guidance from a set of replacement constraints.

The storage medium 106 may hold a file 112, a file 114 and a file 116. The file 112 may be implemented as a library file. The file 112 generally comprises one or more cell libraries 118 (e.g., 118a-118b). The file 114 may be implemented as a design file. The file 114 may contain a circuit design comprising many cell modules. The file 116 may be implemented as a constraint file. The file 116 may hold limitations generated by the program 108 that limit the program 110 in selection of replacement cell modules from the cell libraries 118. In some embodiments, the software program 108, the software program 110, the file 112, the file 114 and the file 116 may be stored in the same storage medium (e.g., 104).

Figure 3:
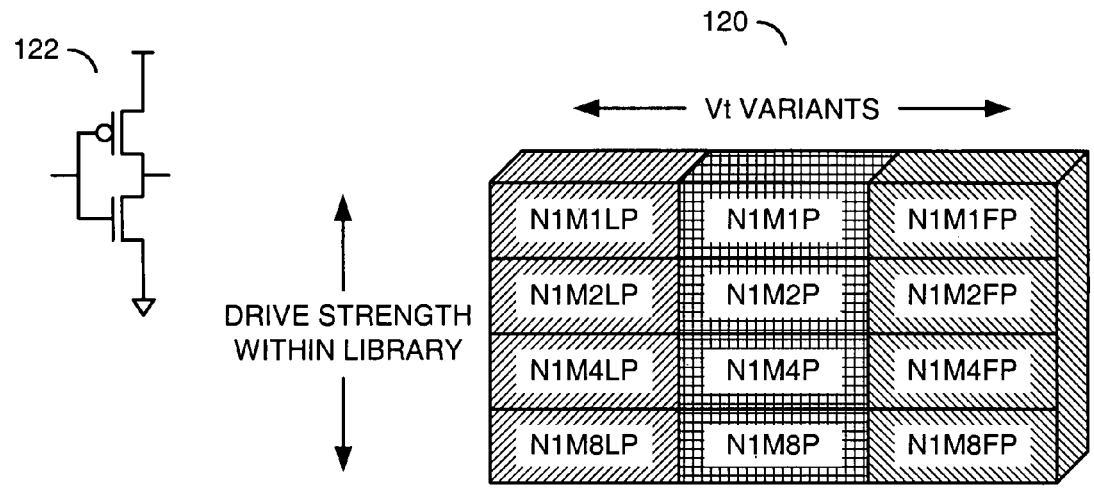
FIG. 3 is a diagram of an example file illustrating cell library options.

Referring to FIG. 3, a diagram of an example file 120 illustrating cell library options is shown. The file 120 may represent any one or more of the cell libraries 118a-118b and/or the file 112. Each block in the file 120 may provide a different implementation (e.g., layout and/or performance) of a same circuit module (e.g., an inverter 122). Each of the blocks in the file 120 generally differs only by transistor process parameters (e.g., ion implantation to vary a threshold voltage Vt of the transistors) and/or transistor layout parameter variations (e.g., transistor channel length and/or channel width) to reduce sub-threshold leakage between a source diffusion and a drain diffusion. The block variations illustrated are generally intended to reduce a static power consumption (e.g., leakage currents) but may have a side effect of having different performances (e.g., less leakage may be associated with slower cells).

The different shadings generally indicate either different subsets (e.g., 3 subsets) of cells within a single library or different cell libraries. Each shade may represent a different subset/library with different power and/or timing characteristics. For example, the "LP" subset/library may include low power versions of the module 122 (e.g., labeled "N1M") having a first (e.g., high) threshold voltage. The numbers "1" through "8" may indicate increasing drive strengths within the library. Likewise, the "P" subset/library may include normal power versions of the module at a second (e.g., intermediate) threshold voltage and the "FP" subset/library may include full power versions of the module at a third (e.g., low) threshold voltage.

Figure 4:
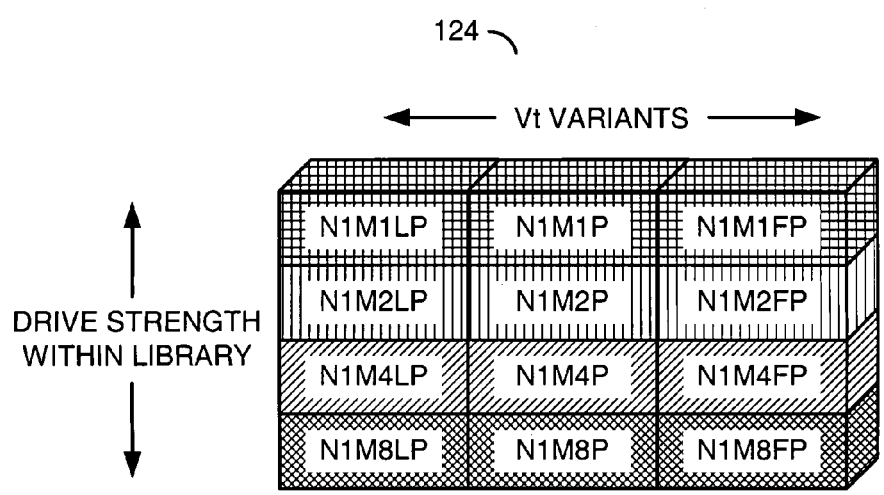
FIG. 4 is a diagram of an example file illustrating cell footprint compatibility.

Referring to FIG. 4, a diagram of an example file 124 illustrating cell footprint compatibility is shown. The file 124 may contain the same cell modules as the file 120. The shading generally indicates groupings of identical sized cells. Within each group, the various cells may differ by a single transistor parameter, such as a process parameter (e.g., a Vt implant) or a channel length parameter. Each subset/library may have the same dynamic switching power, but very different leakage (e.g., N1M8FP may have more than 100× the leakage of N1M8LP). Because all of the cells within a row may be the same size, the program 110 may easily swap the cells to find a best timing/static power compromise without experiencing area problems.

Figure 5:
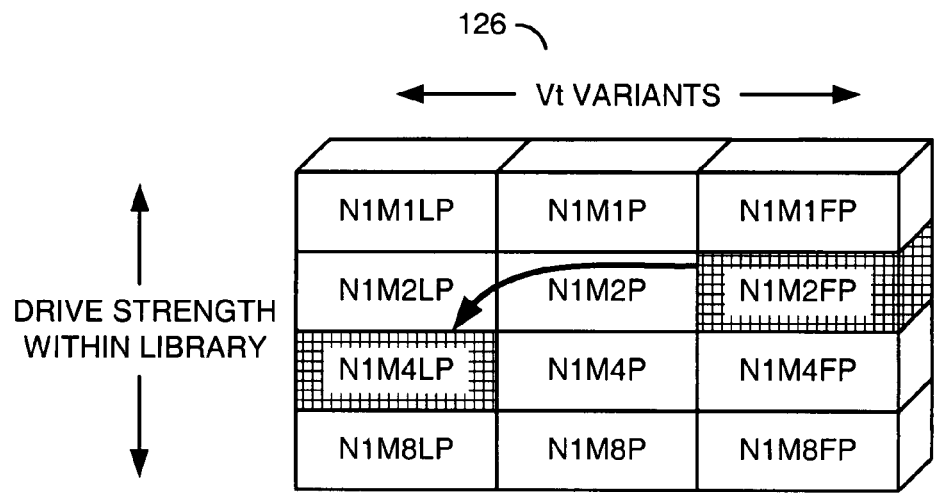
FIG. 5 is a diagram of an example file illustrating a cell selection dilemma.

Referring to FIG. 5, a diagram of an example file 126 illustrating a cell selection dilemma is shown. The file 126 may contain the same cell modules as the file 120 and/or the file 124. A dilemma may exist between static power optimization and dynamic power optimization. For a given load, two of the shaded cells (e.g., N1M2FP and N1M4LP) may have identical timing, so either could be used by the program 110. If low dynamic power is important, an initial synthesis of a circuit may include the N1M2FP version due to a smaller area and a lower dynamic power consumption compared with the N1M4LP cell. However, at the optimization phase the program 110 may swap out the N1M2FP cell in favor of the N1M4LP cell, if enough room is available. Utilization of the N1M4LP cell instead of the N1M2FP cell may greatly reduce the static power consumption, but generally increases the dynamic power consumption (causing the dilemma). Furthermore, in most cases the N1M4LP cell may be faster than the N1M2FP cell with any sizeable load. Hence, the initial synthesis may use the slightly faster (and bigger) N1M4LP cell where low static power consumption is important.

Figure 6:
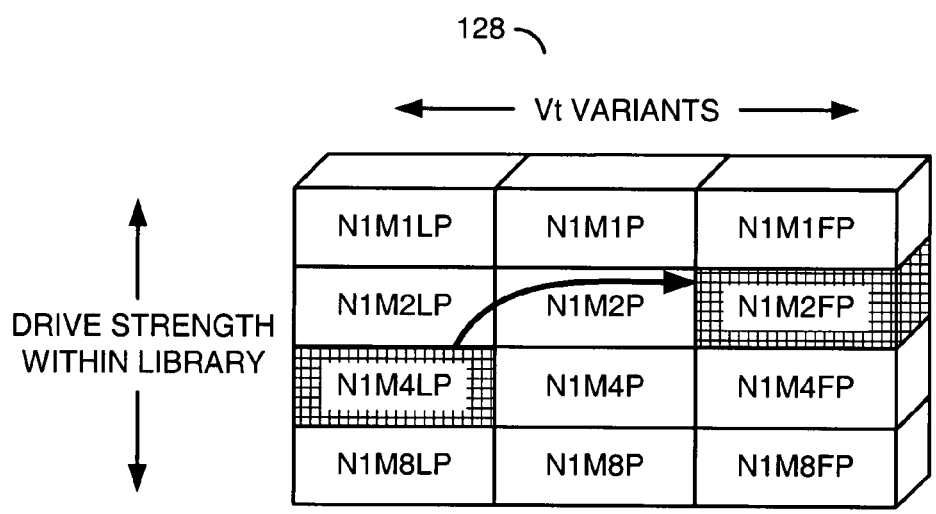
FIG. 6 is a diagram of an example file illustrating a cell selection for dynamic power consumption.

Referring to FIG. 6, a diagram of an example file 128 illustrating cell selection for dynamic power consumption is shown. The file 128 may contain the same cell modules as the file 120, the file 124 and/or the file 126. In a dynamic power dominated case, if sufficient room exists for the N1M4LP version of the cell, then the program 110 may replace the N1M4LP cell with the physically smaller N1M2FP cell. As such, the dynamic power consumption of the circuit (or a region within the circuit) may be reduced. Furthermore, the physically smaller N1M2FP cell generally gives opportunities elsewhere in the layout to change the size of the other cells. A more granular library may also provide a good replacement option. If the file 128 includes an intermediate drive strength cell in the FP column (e.g., an N1M3FP version of the cell), the program 110 may replace the N1M4LP cell with the N1M3FP cell to achieve a lower dynamic power.

Referring again to FIG. 5, the program 108 may generate the file 116 to optimize the design for static power consumption. In a static power dominated case, the reverse arguments to the dynamic power dominated case offer insight as to the best choices for lowest static power. The low Vt cells (e.g., the FP library) generally have very high leakage currents (e.g., 10× to 100× the leakage currents of the high Vt cells in the LP library). As such, the design tool 100 may replace the N1M2FP cell with the N1M4LP cell to lower the static power consumption (and probably increase the switching speed). Generally, the FP library may be used very sparingly due to the higher static power consumption as compared with the LP library. Only a few paths in the circuit design having high speed criteria may use any of the FP cells. Furthermore, the FP cells implemented in the paths may gain enough timing margin to convert other cells in the same paths back to the LP cells.

Figure 7:
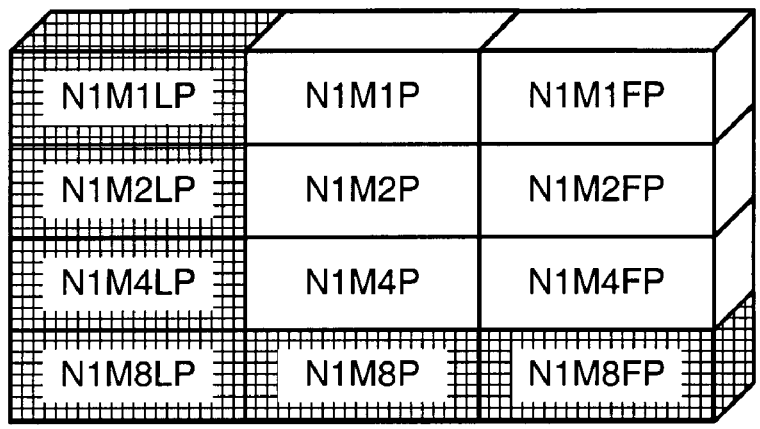
FIG. 7 is a diagram of an example file restricted in two parameter dimensions for static power optimization.

Referring to FIG. 7, a diagram of an example file 130 restricted in two parameter dimensions for static power optimization is shown. The restriction (file 116) generally limits the program 110 to work with the LP cells in the file 130. If the N1M8LP cell is too large to be placed in the available area, the file 116 may enable the program 110 to also draw from the N1M8 cells along the bottom row of the matrix. Use of either the N1M8P cell or the N1M8FP cell may increase the overall static power consumption by trading for a lower cell area. Other variations of the restrictions may be made for static power optimization to meet the criteria of a particular optimization.

Figure 8:
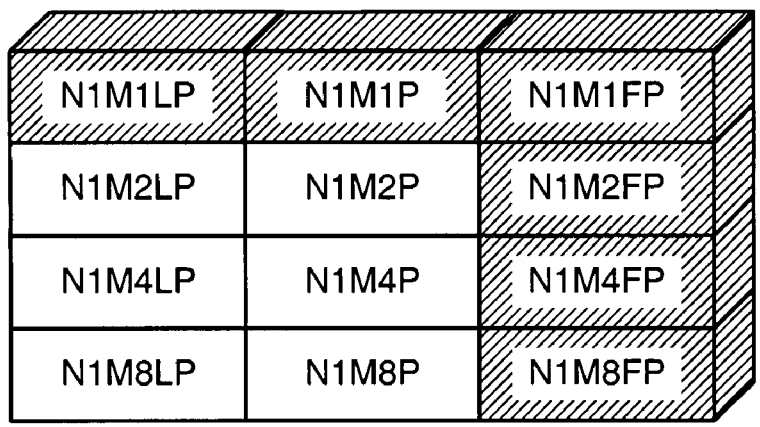
FIG. 8 is a diagram of an example file restricted in two parameter dimensions for dynamic power optimization.

Referring to FIG. 8, a diagram of an example file 132 restricted in two parameter dimensions for dynamic power optimization is shown. The file 116 may limit the cells available to the program 110 to the FP cells in the FP subset/library. Should sufficient area be available, the file 116 may also enable the program 110 to use either the N1M1P cell and/or the N1M1LP cell in the design to lower the overall static power consumption. Other variations of the restriction may be made for dynamic power optimization to meet the criteria of a particular optimization.

Figure 9:
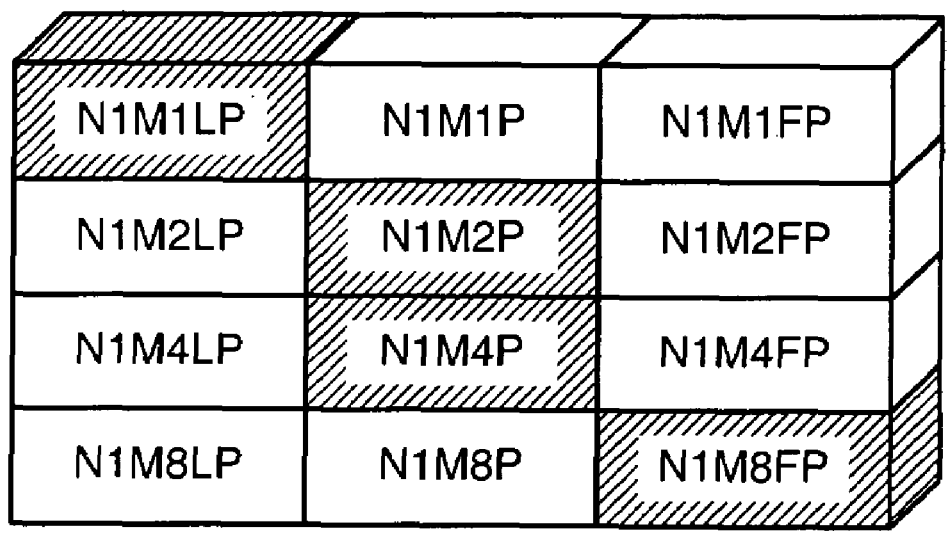
FIG. 9 is a diagram of an example file restricted in two parameter dimensions for balanced power optimization.

Referring to FIG. 9, a diagram of an example file 134 restricted in two parameter dimensions for balanced power optimization is shown. In such a case, the file 116 may offer the program 110 a variety of cells across all drive strengths and threshold voltages. The available cells may be clustered along a straight line (shown) or a curved line through the matrix of the file 134. Other variations of the restrictions may be made for balanced power optimization (neither static power dominated or dynamic power dominated) to meet the criteria of a particular optimization.

Figure 10:
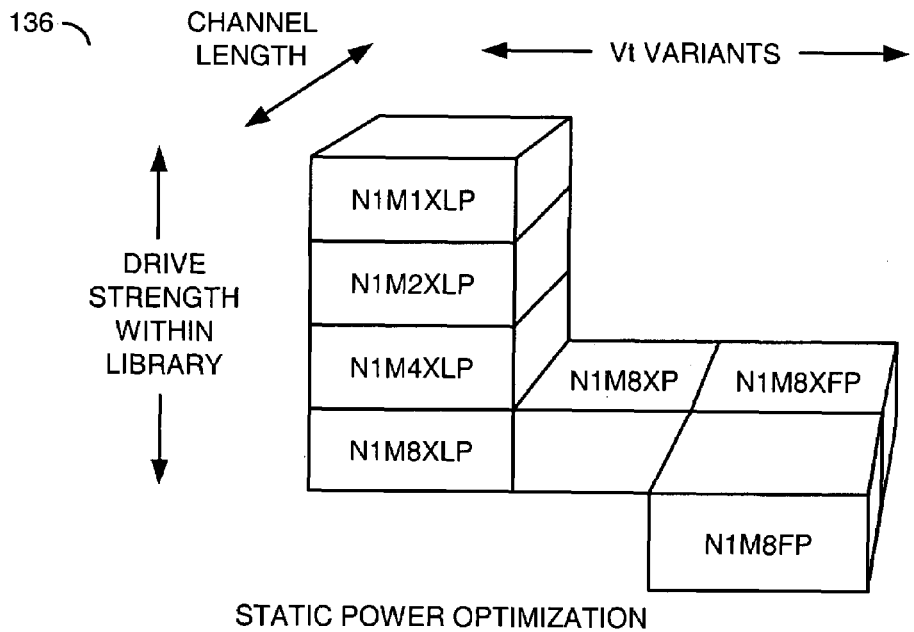
FIG. 10 is a diagram of an example file restricted in three parameter dimensions for static power optimization.

Referring to FIG. 10, a diagram of an example file 136 restricted in three parameter dimensions for static power optimization is shown. The basic distribution of ideal libraries and cells may be extended if a channel length parameter is also used as a leakage lowering mechanism. Extended channel lengths may slightly increase gate capacitance (and dynamic power). As such, the static power dominated file 130 (FIG. 7) may be expanded to include an "X" plane of cells (e.g., N1M1XLP) having an even lower static power consumption. The program 108 may generate the file 116 to limit the program 110 to the XLP subset/library with allowances for the N1M8XP cell and the N1M8XFP cell where smaller cell sizes are appropriate. The file 116 may also permit the program 110 to insert the cell N1M8FP into the circuit design layout under appropriate conditions. Other subsets of cells may be identified to meet the criteria of a particular optimization.

Figure 11:
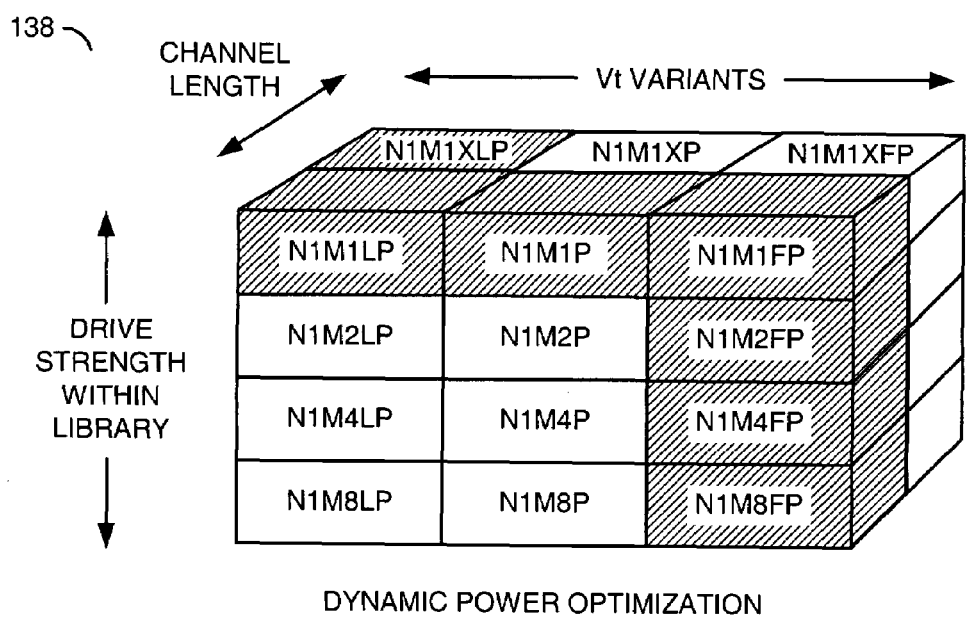
FIG. 11 is a diagram of an example file restricted in the three parameter dimensions for dynamic power optimization.

Referring to FIG. 11, a diagram of an example file 138 restricted in the three parameter dimensions for dynamic power optimization is shown. As with FIG. 8, the file 116 may limit the program 110 to primarily the FP library and both the N1M1P cell and the N1M1LP cell as appropriate. In addition, the file 116 may allow the program 110 to select the N1M1XLP cell under specific conditions. Other subsets of cells may be identified to meet the criteria of a particular optimization.

Figure 12:
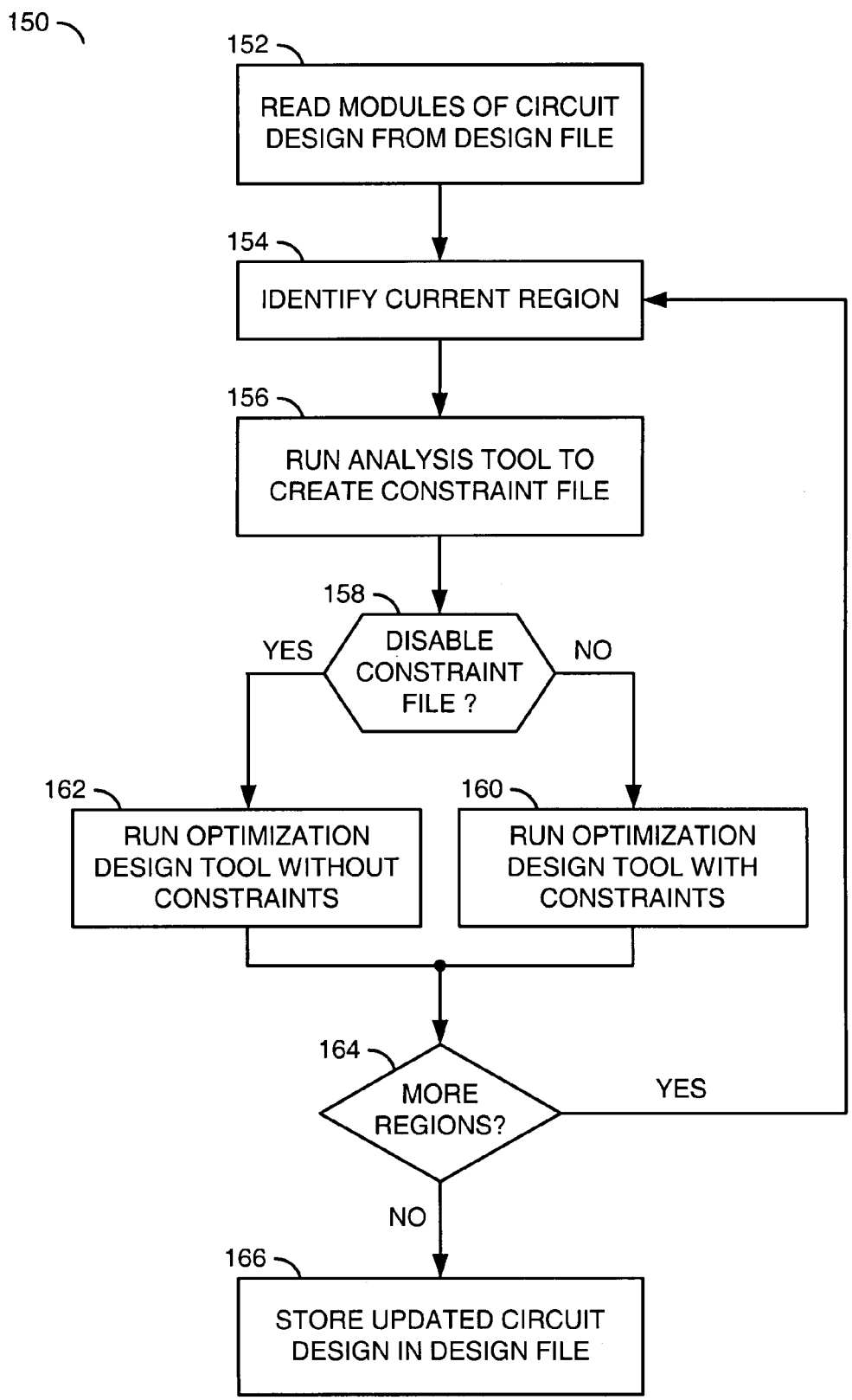
FIG. 12 is a flow diagram of an example method of managing a cell library concerning power optimization.

Referring to FIG. 12, a flow diagram of an example method 150 of managing a cell library concerning power optimization is shown. The method (or process) 150 generally comprises a step (or block) 152, a step (or block) 154, a step (or block) 156, a step (or block) 158, a step (or block) 160, a step (or block) 162, a step (or block) 164 and a step (or block) 166. The method 150 generally begins by determining the relative sensitivities to dynamic and static power to determine which power mode dominates the circuit design and by how much. Next, the design tools 110 may be limited to a subset of the libraries that have an appropriate monotonic relationship between power and area which emphasizes power reduction for the appropriate power mode. The determinations and limitations are generally repeated for other sub-circuits (regions) in the design that may differ in power characteristics.

In the step 152, the initial modules used in a circuit design layout may be read by the program 108 from the design file 114. A current region of the circuit design to be analyzed may be identified in the step 154. In some cases, the region may by the entire circuit design. In other cases, the region may be limited to a specific area or function of the circuit design. For example, a first region may include only the circuitry belonging to a reset operation of the circuit that rarely changes states (e.g., static power dominated). In another example, a second region may include only the circuitry belonging to a clock generation operation that is constantly toggling (e.g., dynamic power dominated).

In the step 156, the program 108 may execute to create the file 116 for the current region. The analysis may be performed using a high capacity transistor level simulator (e.g., Cadence Ultrasim) that measures both the static power and the dynamic power directly. If the total static power is less than the total dynamic power, the current region under consideration may be considered dynamic power dominated. If the total static power is greater than the total dynamic power, the current region may be considered static power dominated. If the dynamic power and the static power are approximately equal, the region may be considered neutral (or balanced). In some embodiments, the analysis may be implemented less precisely with spreadsheet based power calculators, or other available power calculation tools to meet the criteria of a particular application.

A check is generally made in the step 158 to determine if the user of the system 100 wants to disable (override) the file 116. If the file 116 is not disabled (e.g., the NO branch of step 158), the program 110 may be executed in the step 160 with the restrictions in the file 116 to optimize the power consumption of the circuit. If the file 116 is disabled (e.g., the YES branch of step 158), the program 110 may be executed in the step 162 without considering the file 116.

The file 116 generally restricts access of the program 110 to available cells or libraries. An appropriate subset of libraries may depend on what libraries are available and generally use the following rules:

A. For static power dominated circuits, a best subset of cells for a given function in the library file 112 may be one that has all drive strengths for the lowest leakage family (e.g., either high Vt, long channel, or both) and then all leakage families for the biggest drive strength version (e.g., standard and low Vt, or shorter channels, or both).

B. For dynamic power dominated circuits, the best subset of cells for a given function in the library file 112 may be one that has all drive strengths for the highest leakage family (e.g., low Vt with minimum channel length) and then all leakage families for the weakest drive strength version (e.g., higher Vt transistors, longer channels, or both).

C. For equally dominated circuits, the best subset of cells for a given function in the library file 112 may be one that follows a best diagonal line from weak drive and low leakage to strong drive and high leakage. A sufficiently granular library may offer curves that deviate slightly off the diagonal line for circuits that are weakly dominated one way or the other.

A check for more regions may be made in the step 164. If more regions are available for optimization, (e.g., the YES branch of step 164), the next un-optimized region may be identified in the step 154 and the cycle repeated. If no more un-optimized regions exist (e.g., the NO branch of step 164), the updated circuit design may be stored back into the file 114 in the step 166. In some embodiments, the constraints for each region of the circuit design may be stored in either separate areas of the file 116 and/or in separate constraint files. In some embodiments, the updated circuit design may be stored in a new design file to allow for comparison to the original design in the design file 114.

Figure 13:
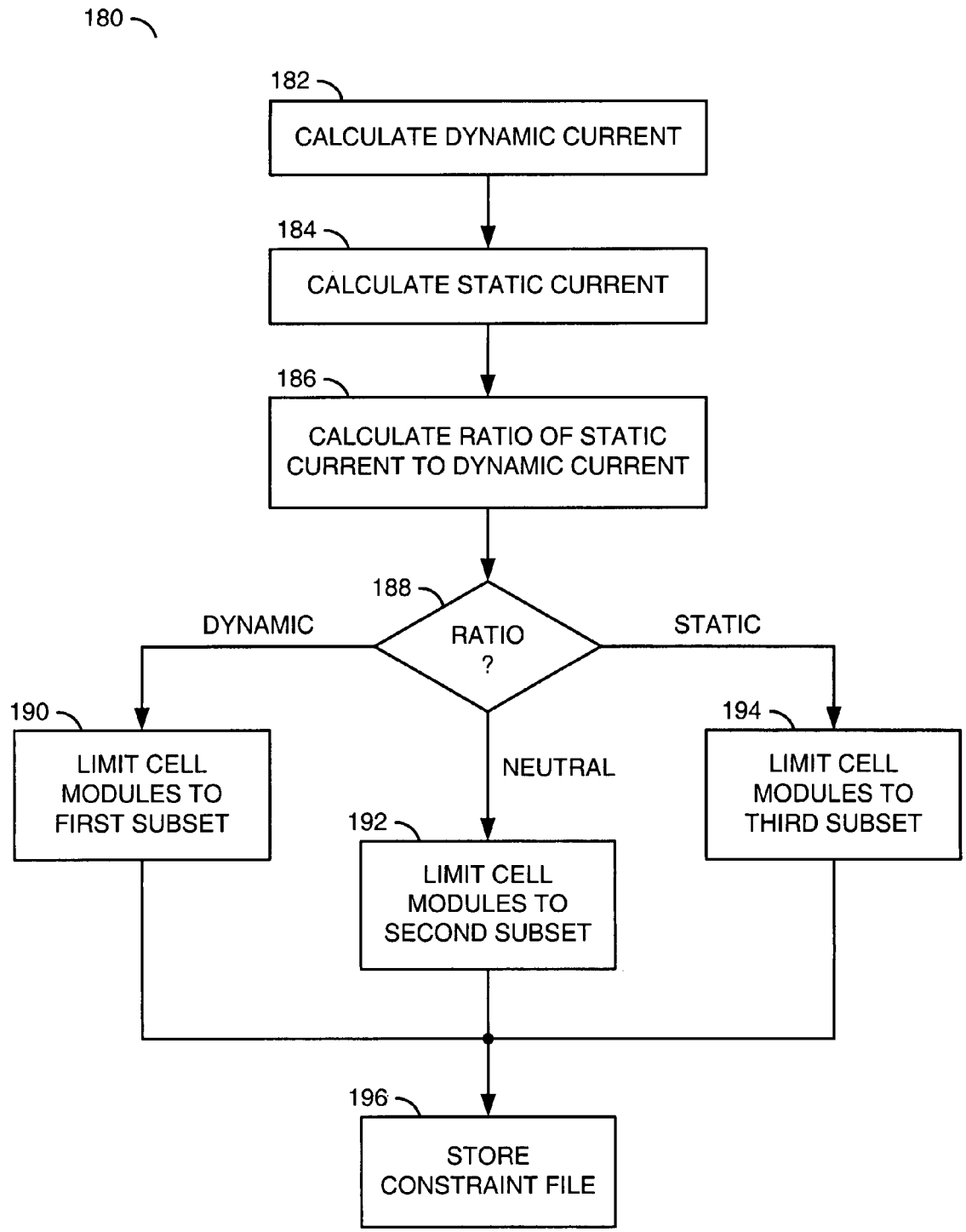
FIG. 13 is a flow diagram of an example method of generating a constraint file.

Referring to FIG. 13, a flow diagram of an example method 180 of generating a constraint file is shown. The method (or process) 180 generally comprises a step (or block) 182, a step (or block) 184, a step (or block) 186, a step (or block) 188, a step (or block) 190, a step (or block) 192, a step (or block) 194 and a step (or block) 196.

In the step 182, the program 108 may calculate a dynamic current consumption within the current region under consideration over a given set of input conditions. In the step 184, the program 108 may also calculate a static current consumption within the current region for the same set of input conditions. A ratio of the static current consumption to the dynamic current consumption (e.g., merit=dynamic/static) may be calculated by the program 108 to establish a merit value for the current region. A check of the ratio (merit value) is generally performed by the program 108 in the step 188.

Figure 14:
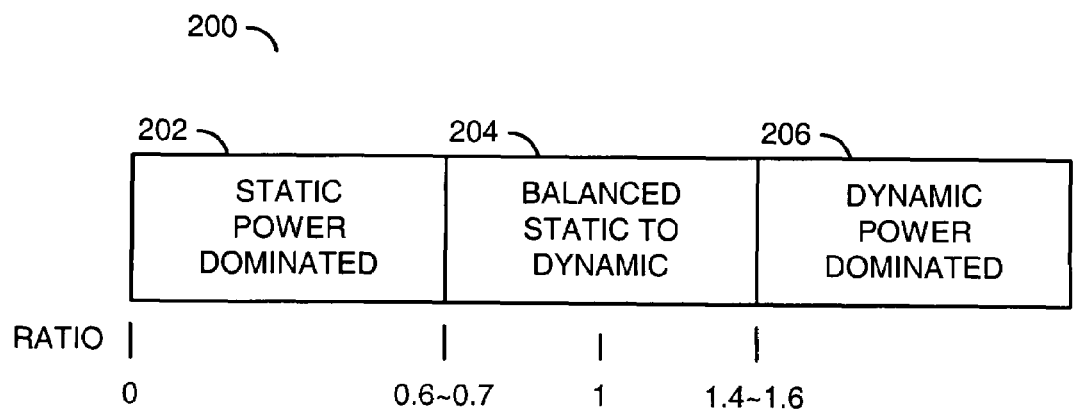
FIG. 14 is a diagram of an example range of a ratio (or merit value)

Referring to FIG. 14, a diagram of an example range 200 of the ratio is shown. The range 200 generally comprises a portion 202, a portion 204 and a portion 206. For a ratio of dynamic power over static power, the portion 202 generally indicates that the current region is dominated by the static power consumption. The portion 204 generally indicates that the current region is roughly balanced between the dynamic power consumption and the static power consumption. The portion 206 generally indicates that the current region is dominated by the dynamic power consumption. For a ratio of static power over dynamic power, the static power portion and the dynamic power portion may be swapped.

The boundary between the portions 202 and 204 and the boundary between the portions 204 and 206 may vary based on the particular application and the cells and/or libraries available for the power optimization. Analysis of an existing set of cell libraries generally indicates that deviations from approximately 30% to 40% away from unity (1) still indicate that the current region is balanced between the static power consumption and the dynamic power consumption. Ratios greater than 30% to 40% away from unity may indicate that the current region is dominated by either the static power consumption or the dynamic power consumption.

Referring again to FIG. 13, if the program 108 determines that the current region is dominated by the dynamic power consumption (e.g., the DYNAMIC branch of step 188), the program 108 may generate the file 116 in the step 190 to limit the program 110 to a first subset of cells/libraries (e.g., FIG. 11) in the step 190. If the current region of the circuit design is balanced (e.g., the NEUTRAL branch of step 188), the file 116 may be generated to limit the program 110 to a second subset of cells/libraries (e.g., FIG. 9) in the step 192. If the current region is dominated by the static power consumption (e.g., the STATIC branch of step 188), the program 108 may generate the file 116 to limit the program 110 to a third subset of cells/libraries (e.g., FIG. 10) in the step 194. Once the appropriate data has been determined to restrict the program 110, the program 108 may store the data of the file 116 in the storage medium 106 per the step 196.

Figure 15:
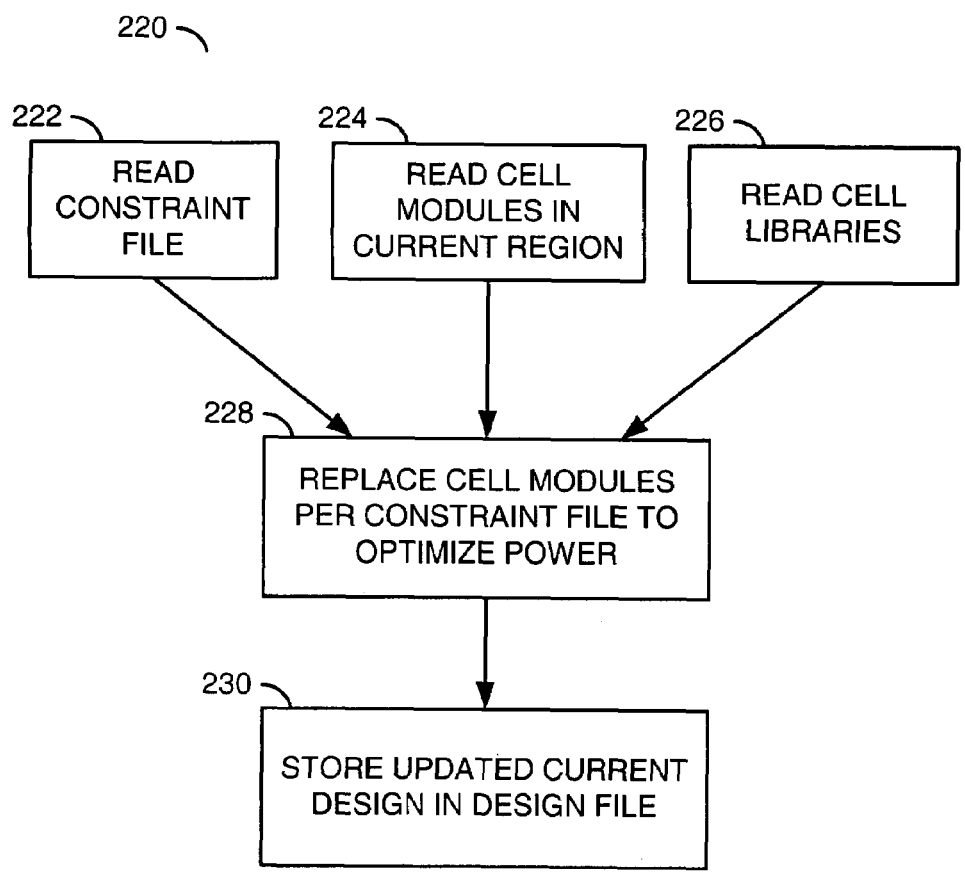
FIG. 15 is a flow diagram of an example method of cell replacement.

Referring to FIG. 15, a flow diagram of an example method 220 of cell replacement is shown. The method (or process) 220 may be implemented in the program 110. The method 220 generally comprises a step (or block) 222, a step (or block) 224, a step (or block) 226, a step (or block) 228 and a step (or block) 230.

In the steps 222, 224 and 226, the program 110 may read the restrictions from file 116, the cell modules of the current region from the file 114 and the allowed cells/libraries from the file 112, respectively. The program 110 may then replace existing cells within the current region with the replacement cells read from the file 112 in the step 228. Since the choice of replacement cells are limited per the data in the file 116, the result is generally a decrease in the overall power consumption of the current region, and thus the circuit. In the step 230, the power optimized current region may be stored back into the file 114 by the program 110. The above steps may be repeated for each current region of the circuit design after the program 108 updates the file 116 for each subsequent region.

The present invention generally allows power optimization by using optimization features of design tools that may already optimize for other criteria. The present invention may also describe a best subset of available cells to optimize for static power, dynamic power or a combination of both. As such, the present invention may enable power optimization with standard tools that may not have a native power optimization capability. Furthermore, currently available libraries may be used instead of developing specialized custom libraries. The present invention may also give controllable, repeatable results due to the matching relationship between power and the optimization criteria (e.g., area) of the design tools.

Other methods of calculating the static power consumption and the dynamic power consumption may be used in calculating the merit values for the various regions in addition to the techniques described above. Custom libraries may optionally be implemented to provide more selection options for the design tools. The present invention may be applied anywhere from chip-wide level to a sub-circuit level. Different libraries subsets may be designated for each level.

The function performed by the flow diagrams of FIGS. 12, 13 and 15 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method of managing a cell library regarding power optimization, comprising the steps of:
   (A) reading a plurality of first modules within a first region of a circuit design stored in a design file;
   (B) calculating a first merit value indicating a relative sensitivity of said first region to a power consumption, said first merit value having a range from a static power dominated value to a dynamic power dominated value; and
   (C) creating a constraint file configured to limit a design tool to a first subset of a plurality of replacement modules based on said first merit value such that said design tool automatically optimizes said power consumption of said first region by replacing at least one of said first modules with at least one of said replacement modules within said first subset, said replacement modules residing in a library file.

2. The method according to claim 1, further comprising the steps of:
   calculating a second merit value for a second region of said circuit design; and
   updating said constraint file to limit said design tool to a second subset of said replacement modules based on said second merit value.

3. The method according to claim 2, wherein said first subset is different than said second subset in a case where said first merit value and said second merit values are within different defined portions of said range.

4. The method according to claim 2, wherein said second subset matches said first subset in a case where both said first merit value and said second merit value are within a same defined portion of said range.

5. The method according to claim 1, wherein step (B) comprises the sub-steps of:
   calculating a dynamic current of said first region;
   calculating a static current of said first region; and
   calculating said first merit value as a ratio of said dynamic current to said static current.

6. The method according to claim 5, wherein (i) said ratio within approximately 40% of unity defines a neutral portion of said range and (ii) said ratio beyond approximately 40% of unity defines at least two respective portions of said range each containing one of said static power dominated value and said dynamic power dominated value.

7. The method according to claim 1, wherein (i) said range comprises a plurality of defined portions and (ii) said replacement modules available to said design tool vary depending upon which of said defined portions said first merit value falls within.

8. The method according to claim 7, wherein (i) said library file stores a plurality of cell libraries and (ii) each one of said defined portions limits said design tool to a respective subset of said cell libraries.

9. The method according to claim 1, wherein at least two transistor parameters determine said first subset among said replacement modules.

10. The method according to claim 9, wherein said transistor parameters comprise at least two of (i) a drive strength parameter, (ii) a threshold voltage parameter and (iii) a channel length parameter.

11. The method according to claim 1, wherein at least three transistor parameters determine said first subset among said replacement modules.

12. The method according to claim 1, further comprising the step of:
   disabling said constraint file in response to a manual input such that said design tool is allowed to replace at least one of said first modules with at least one of said replacement modules outside of said first subset.

13. The method according to claim 1, further comprising a storage medium recording a computer program comprising the steps of claim 1.

14. An apparatus comprising:
   an analysis tool stored in a medium and configured to (i) read a plurality of first modules within a first region of a circuit design stored in a design file, (ii) calculate a first merit value indicating a relative sensitivity of said first region to a power consumption, said first merit value having a range from a static power dominated value to a dynamic power dominated value and (iii) create a constraint file configured to limit a design tool to a first subset of a plurality of replacement modules based on said first merit value such that said design tool automatically optimizes said power consumption of said first region by replacing at least one of said first modules with at least one of said replacement modules within said first subset, said replacement modules residing in a library file; and
   a computer configured to execute said analysis tool.

15. The apparatus according to claim 14, wherein said analysis tool is further configured to (i) calculate a second merit value for a second region of said circuit design, said second region not overlapping said first region and (ii) update said constraint file to limit said design tool to a second subset of said replacement modules based on said second merit value.

16. The apparatus according to claim 15, wherein said design tool optimizes said first region before said analysis tool updates said constraint file.

17. The apparatus according to claim 14, wherein said design tool lacks a built-in power optimization capability.

18. The apparatus according to claim 14, wherein (i) said range comprises a plurality of defined portions and (ii) said replacement modules available to said design tool vary depending upon which of said defined portions said first merit value falls within.

19. The apparatus according to claim 18, further comprising a plurality of cell libraries stored in said library file, wherein each one of said defined portions limits said design tool to a respective subset of said cell libraries.

20. An apparatus comprising:
   means for storing a circuit design in a design file; and
   means for (i) reading a plurality of first modules within a first region of said circuit design, (ii) calculating a first merit value indicating a relative sensitivity of said first region to a power consumption, said first merit value having a range from a static power dominated value to a dynamic power dominated value and (iii) creating a constraint file configured to limit a design tool to a first subset of a plurality of replacement modules based on said first merit value such that said design tool automatically optimizes said power consumption of said first region by replacing at least one of said first modules with at least one of said replacement modules within said first subset, said replacement modules residing in a library file.

* * * * *